(12) United States Patent
Richter et al.

(10) Patent No.: US 7,784,458 B2
(45) Date of Patent: Aug. 31, 2010

(54) MODULAR FLUE ADAPTER SYSTEM AND METHOD

(75) Inventors: Jeffrey H. Richter, Coquitlam (CA); George H. K. Lau, Vancouver (CA)

(73) Assignee: FPI Fireplace Products International Ltd., Delta (CA)

( * ) Notice: Subject to any disclaimer, the term of this patent is extended or adjusted under 35 U.S.C. 154(b) by 0 days.

(21) Appl. No.: 12/044,468

(22) Filed: Mar. 7, 2008

(65) Prior Publication Data

US 2008/0216820 A1 Sep. 11, 2008

Related U.S. Application Data

(60) Provisional application No. 60/894,083, filed on Mar. 9, 2007.

(51) Int. Cl.
*F24C 1/14* (2006.01)
(52) U.S. Cl. .......................... 126/80; 126/82; 126/301; 126/315; 126/500
(58) Field of Classification Search ................. 126/315, 126/500, 80, 301, 82
See application file for complete search history.

(56) References Cited

U.S. PATENT DOCUMENTS

| | | | | | |
|---|---|---|---|---|---|
| 975,703 | A | * | 11/1910 | McDonald | 126/315 |
| 1,273,695 | A | * | 7/1918 | Unsworth | 126/536 |
| 1,278,895 | A | * | 9/1918 | Farley | 126/315 |
| 1,516,169 | A | * | 11/1924 | Wilkinson et al. | 126/315 |
| 1,935,751 | A | * | 11/1933 | Stuart et al. | 126/535 |
| 4,019,491 | A | * | 4/1977 | DiRocco | 126/500 |
| 4,026,264 | A | * | 5/1977 | Henriques | 126/528 |
| 4,153,036 | A | * | 5/1979 | Billmeyer et al. | 126/515 |
| 4,230,092 | A | * | 10/1980 | Henriques | 126/527 |
| 4,424,794 | A | * | 1/1984 | Page | 126/500 |
| 4,584,986 | A | * | 4/1986 | Cannata | 126/500 |
| 4,683,623 | A | * | 8/1987 | Cannata | 126/523 |
| 4,700,687 | A | * | 10/1987 | Bailey et al. | 126/500 |
| 4,875,463 | A | * | 10/1989 | Washington | 126/80 |
| 4,898,154 | A | * | 2/1990 | Richison | 126/500 |
| 4,924,850 | A | * | 5/1990 | Rieger | 126/500 |
| 5,267,552 | A | * | 12/1993 | Squires et al. | 126/512 |
| 5,299,558 | A | * | 4/1994 | Binzer | 126/512 |
| 5,303,693 | A | * | 4/1994 | Schroeter et al. | 126/522 |
| 5,419,307 | A | * | 5/1995 | Linkletter et al. | 126/307 R |
| 5,575,274 | A | * | 11/1996 | DePalma | 126/512 |
| 5,647,340 | A | * | 7/1997 | Shimek et al. | 126/85 B |
| 5,669,374 | A | * | 9/1997 | Valters et al. | 126/512 |
| 5,752,500 | A | * | 5/1998 | Jamieson et al. | 126/512 |
| 5,762,062 | A | * | 6/1998 | Hawkinson et al. | 126/85 B |
| 6,463,926 | B1 | * | 10/2002 | Flick et al. | 126/512 |
| 6,543,437 | B1 | * | 4/2003 | Luu et al. | 126/85 B |
| 7,066,170 | B1 | * | 6/2006 | Atemboski et al. | 126/518 |
| 2005/0000510 | A1 | * | 1/2005 | Holt et al. | 126/500 |
| 2006/0283442 | A1 | * | 12/2006 | Miles et al. | 126/523 |
| 2007/0101987 | A1 | * | 5/2007 | Atemboski et al. | 126/518 |

\* cited by examiner

*Primary Examiner*—Kenneth B Rinehart
*Assistant Examiner*—Jorge Pereiro
(74) *Attorney, Agent, or Firm*—Snell & Wilmer L.L.P.

(57) ABSTRACT

A modular flue adapter system and method is described to accommodate a conduit for exhaust between a firebox and a firebox flue, wherein the firebox is inserted into a firebox opening, by providing an offset distance and/or direction between the exhaust of the firebox and the firebox flue.

7 Claims, 11 Drawing Sheets

MODULAR FLUE ADAPTER SYSTEM AND METHOD

CROSS-REFERENCE TO RELATED APPLICATIONS

This application claims the benefit of U.S. Provisional Patent Application Ser. No. 60/894,083, entitled MODULAR FLUE ADAPTER SYSTEM AND METHOD, filed Mar. 9, 2007, which is incorporated by reference herein in its entirety.

FIELD OF INVENTION

The present invention relates to firebox flue adapters. More particularly, the present invention relates to a modular flue system and method for adapting the exhaust of a firebox to a preexisting firebox flue.

BACKGROUND OF THE INVENTION

As part of general home remodeling or updating, one of the tasks regularly undertaken by homeowners is updating their firebox with a more modern firebox insert. The new firebox is inserted into the old firebox opening, and to accommodate the new firebox, the preexisting firebox flue is used as the exhaust for connection to the exhaust of the new firebox unit. The preexisting flue is used for convenience to alleviate the need to re-route a new exhaust.

Modern fireboxes typically come equipped with the exhaust positioned at or towards the rear of the unit. As can be expected, the consumer prefers that the firebox, when installed into the firebox opening, occupy as much of the opening as possible so that the appearance is aesthetically appealing and the unit is perceived to be an integral part of the opening. For example, it would be unappealing to have large or uneven gaps around the new unit, between it and the firebox opening. However, one consequence of achieving this close fit by the updated firebox into the opening is that it is often difficult for the installer to accomplish a secure tight fit between the exhaust of the unit, which is at the rear of the unit, and the preexisting firebox flue. As a result, an inefficient seal and/or faulty connection can occur. This consideration is especially significant in terms of heating, cooling and general energy efficiency because of ever increasing energy consumption and costs. An inefficient seal and/or faulty connection also presents significant safety concerns.

There is thus a need for a flue adapter to ease the connection from the new firebox exhaust to the preexisting flue in a manner that provides for a more secure and effective seal. Moreover, there is a need for a flue adapter that can accommodate an offset distance and/or direction between the exhaust of the new firebox and the preexisting flue.

SUMMARY OF THE INVENTION

In accordance with various aspects of the present invention, a modular flue adapter system and method can accommodate a conduit for exhaust between a firebox unit and a preexisting firebox flue by providing an offset distance and/or direction between the exhaust of the firebox and the firebox flue. In various embodiments, the modular flue adapter comprises one or more of an exhaust flow cavity, an exhaust fan, an exhaust backflow prevention device, a flue closure device (e.g., a damper), and a device to deter mammals, birds and/or insects.

BRIEF DESCRIPTION OF THE DRAWINGS

The exemplary embodiments of the present invention will be described in conjunction with the appended drawing figures in which like numerals denote like elements and.

DETAILED DESCRIPTION

The present invention may be described herein in terms of various functional components. It should be appreciated that such functional components may be realized by any number of hardware components, electrical, mechanical, gravitational, magnetic, and the like configured to perform the specified functions. In addition, the present invention may be practiced in any number of firebox and/or heating system contexts and the firebox systems and methods described herein are merely exemplary applications of the invention. Further, it should be noted that the present invention may employ any number of conventional techniques for adapting the exhaust from a firebox to a flue, and such general techniques that may be known to those skilled in the art are not described in detail herein.

In accordance with various aspects of the present invention and described in greater detail below, a modular flue adapter system and method can provide for the connection between a new firebox exhaust and a preexisting flue in a manner that provides for a secure and effective seal. In addition, a flue adapter in accordance with an exemplary embodiment can accommodate an offset distance between the exhaust of the new firebox and the preexisting flue. In accordance with an exemplary embodiment, a modular flue adapter system comprises a firebox, a firebox flue, and a modular device comprising a first portion connected to the firebox and a second portion configured to provide the conduit for exhaust between the firebox and the firebox flue. For example, by accommodating an offset distance between the firebox exhaust and the preexisting flue, a close fit of the updated firebox into the firebox opening can be achieved.

Figure 1A:
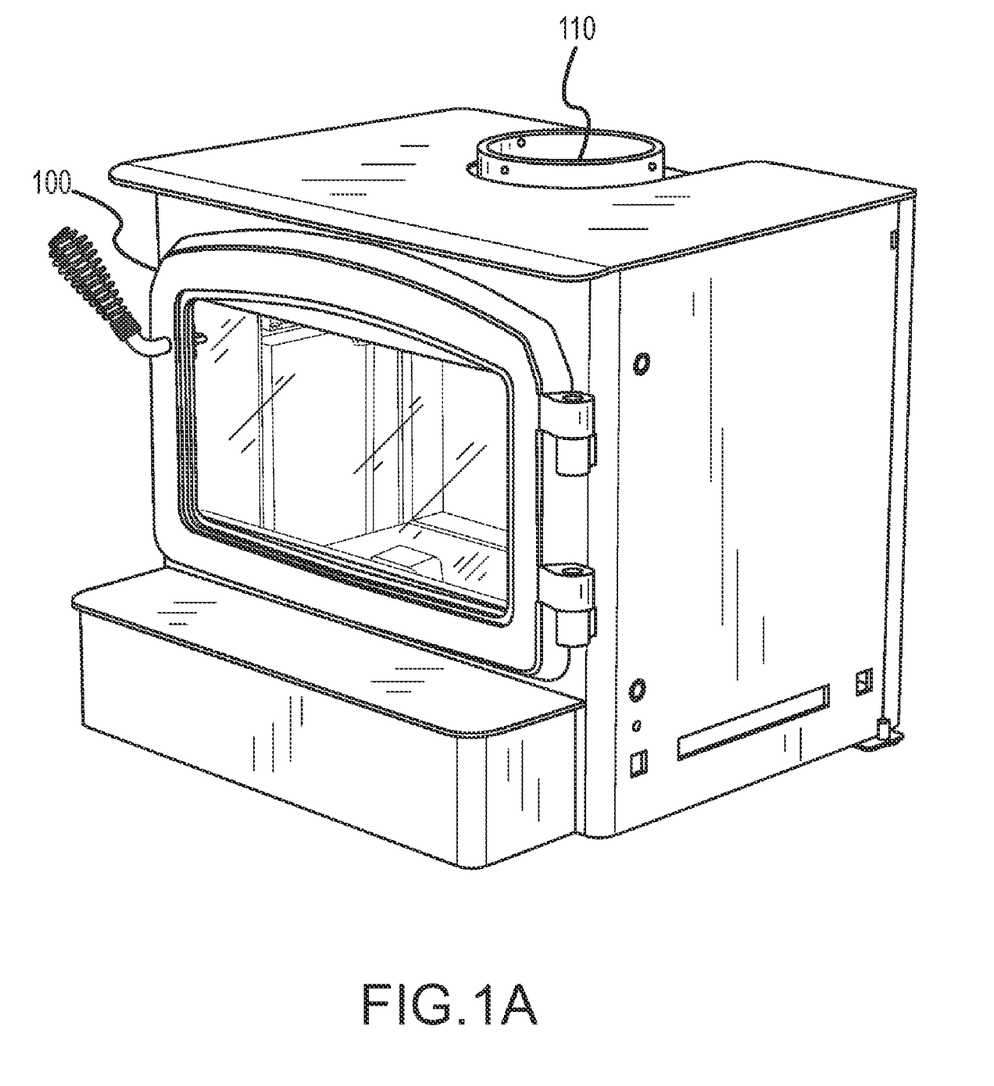
FIG. 1A illustrates an exemplary embodiment of the present invention showing a perspective view of the front, top, and one side of a firebox unit comprising a standard sized flue adapter.
Figure 1B:
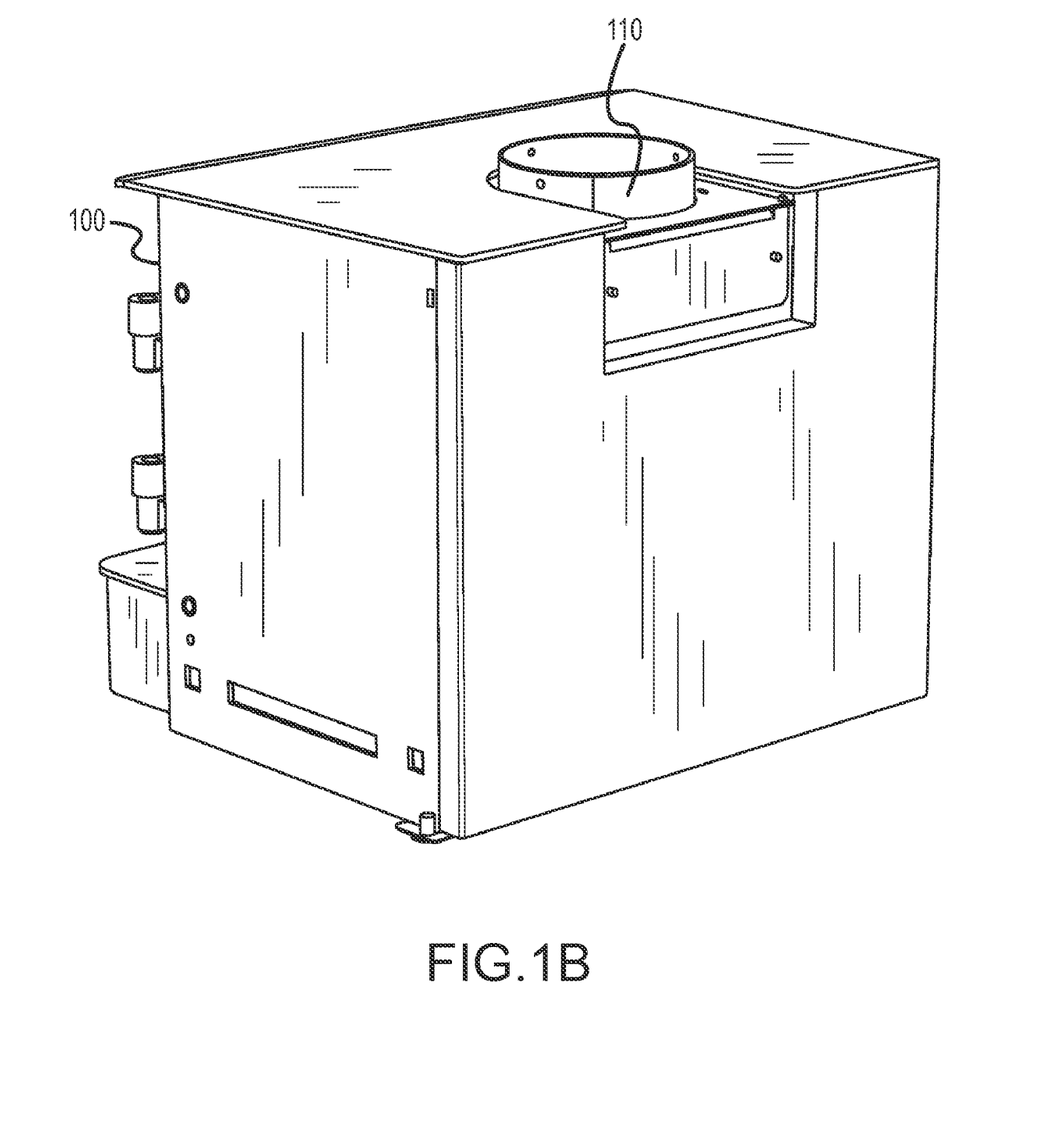
FIG. 1B illustrates an exemplary embodiment of the present invention showing a perspective view of the rear, top, and one side of a firebox unit comprising a standard sized flue adapter.
Figure 2A:
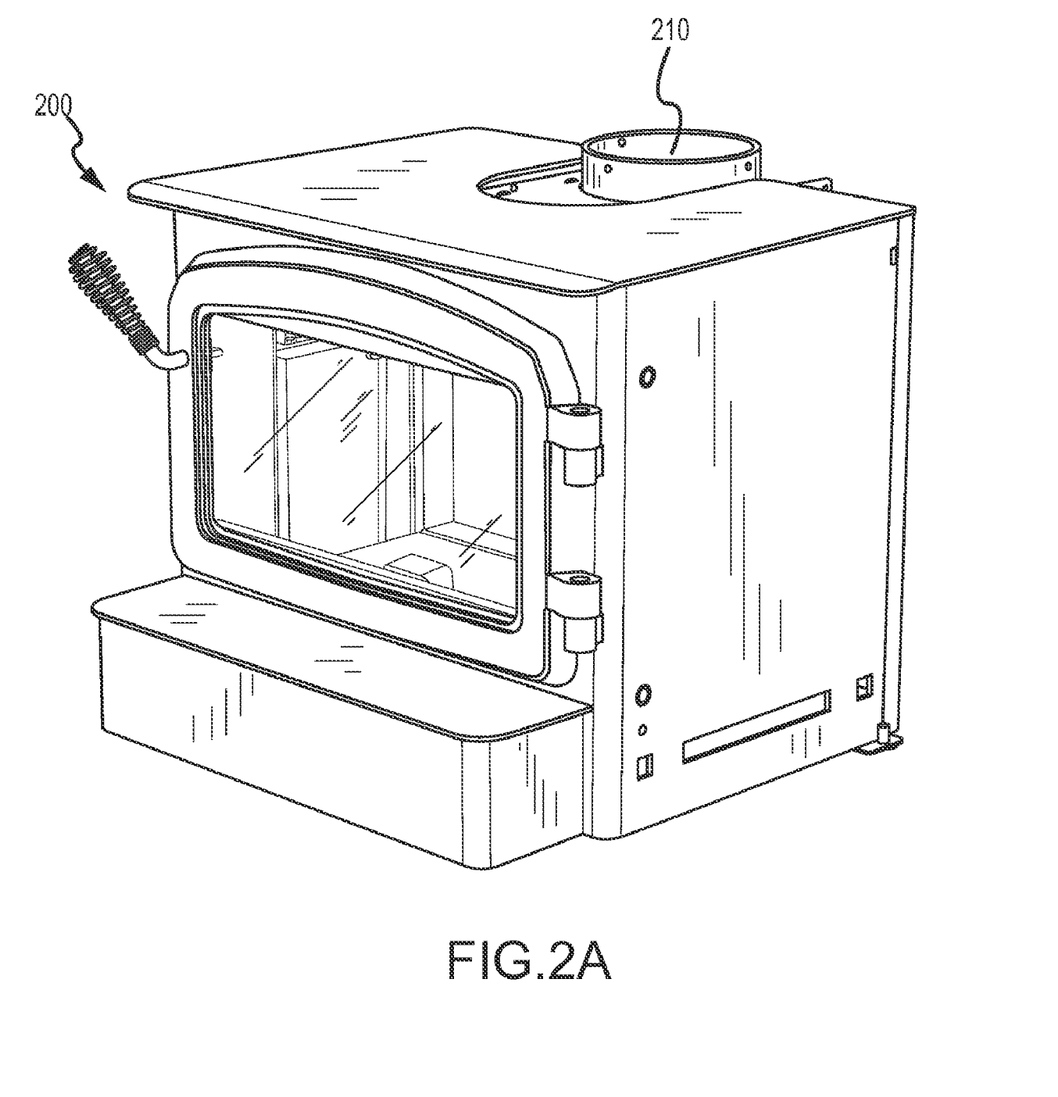
FIG. 2A illustrates an exemplary embodiment of the present invention showing a perspective view of the front, top, and one side of a firebox unit comprising an offset flue adapter of the present invention.
Figure 2B:
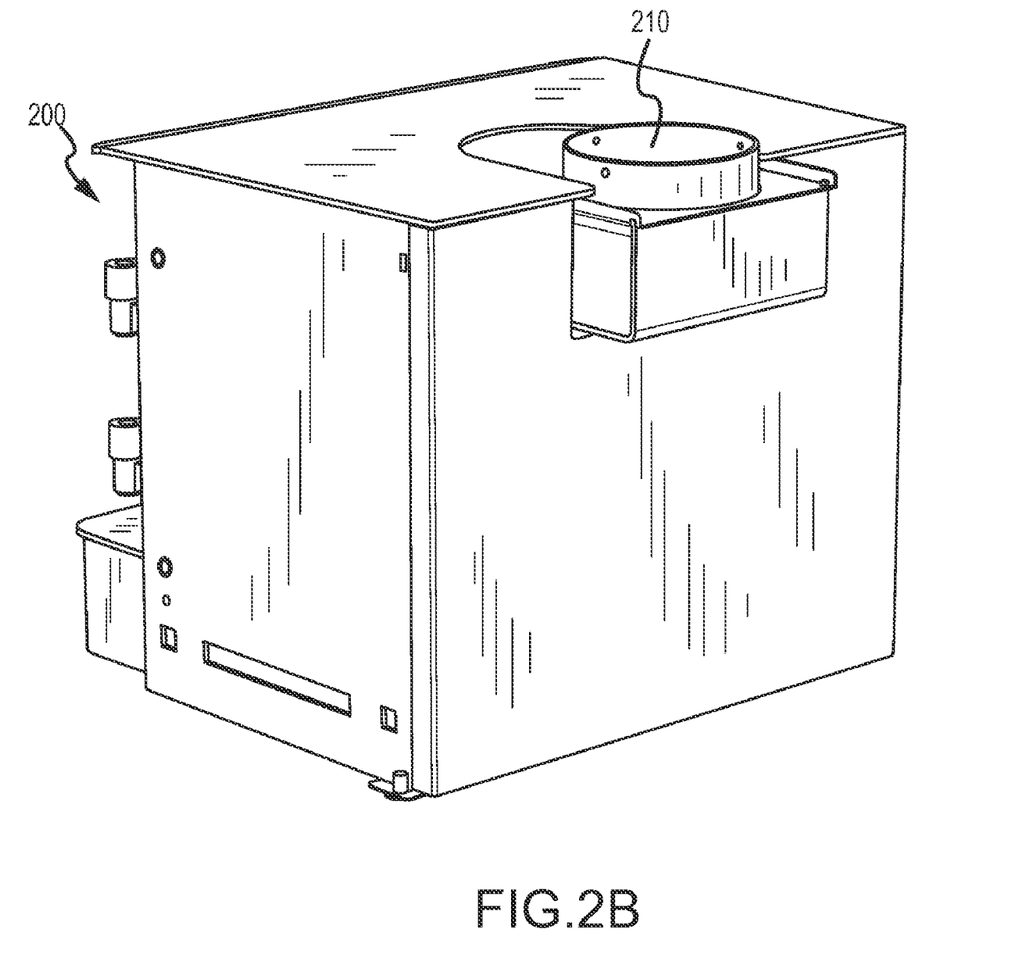
FIG. 2B illustrates an exemplary embodiment of the present invention showing a perspective view of the rear, top, and one side of a firebox unit comprising an offset flue adapter of the present invention.
Figure 2C:
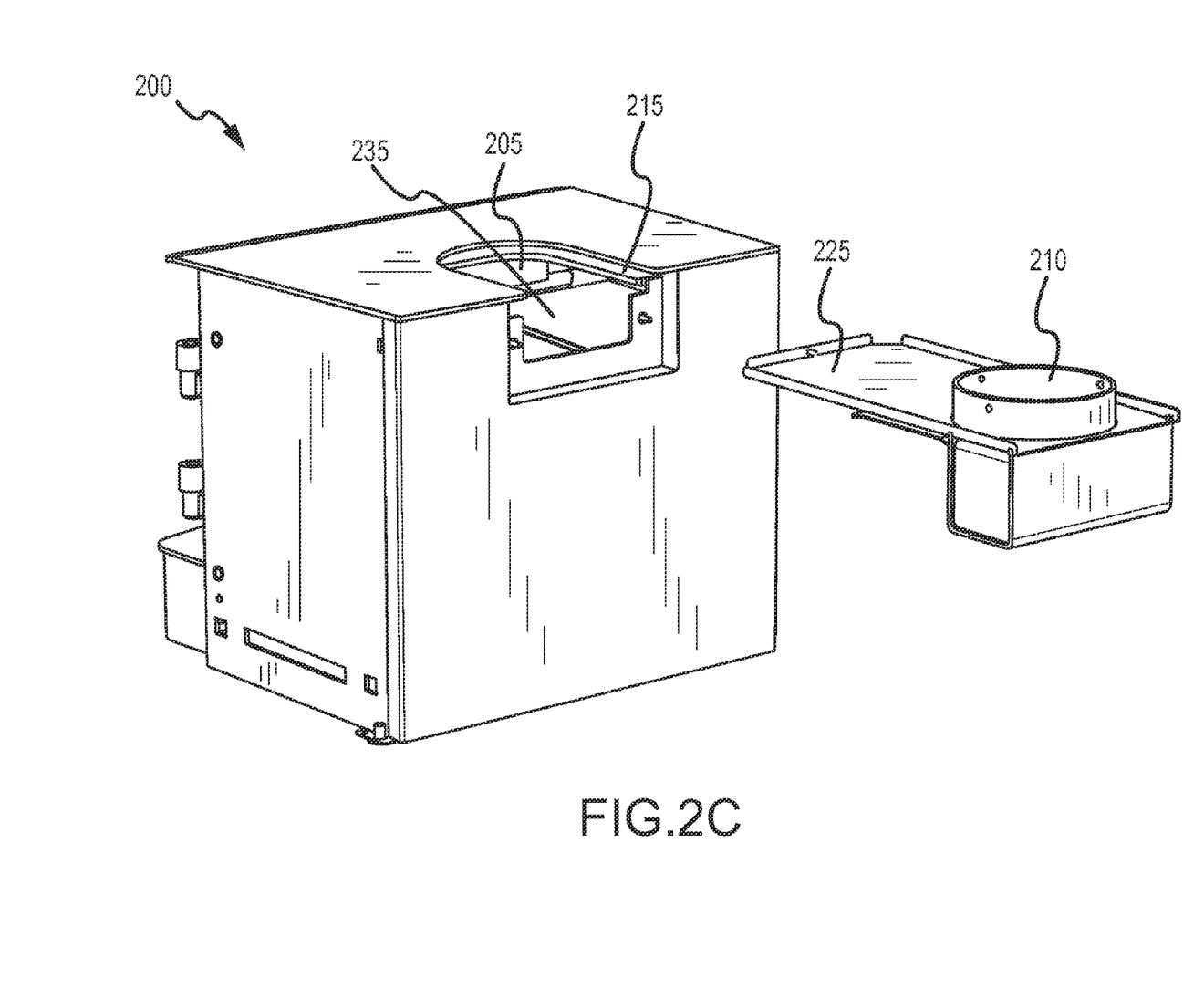
FIG. 2C illustrates an exemplary embodiment of the present invention showing a perspective view of a firebox with an offset flue adapter apart from its assembled position within the firebox unit.

In accordance with an exemplary embodiment and with reference to FIGS. 1A and 1B, an exemplary modular flue adapter system comprises a firebox 100, a modular device 110, and a firebox flue (not illustrated). Similarly, FIGS. 2A, 2B and 2C illustrate firebox 200 and modular device 210. Firebox 100 may take on any number of permutations and maintain the spirit of the invention described herein. "Firebox", as used in the description of the present invention, may be any object now known or later contemplated having an exhaust. By example, such permutations may include any original or updated fireplace, stove, insert, dryer or heater, whether it burns gaseous fuel (e.g., natural gas, propane, etc.) or solid fuel (e.g., wood, coal, etc.), and whether it be a standalone object or an object to be inserted into a firebox opening. In a similar manner, the firebox flue may be any preexisting or updated exhaust outlet.

Figure 3A:
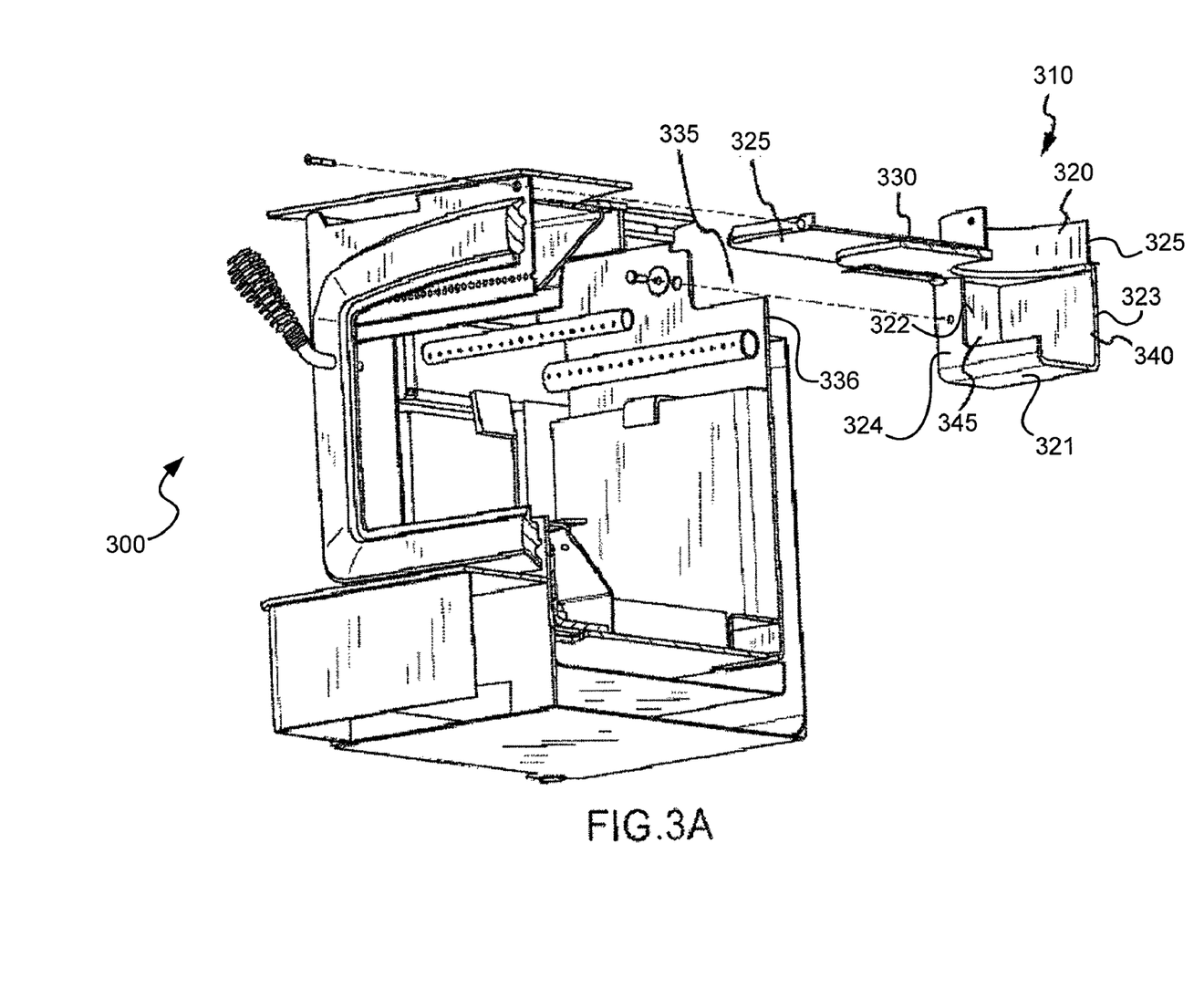
FIG. 3A illustrates an exemplary embodiment of the present invention showing a cutaway view of a firebox and an offset flue adapter apart from its assembled position within the firebox unit.

In accordance with various exemplary embodiments, firebox 100 comprises one or more of a receiving portion 215 and an exhaust output 205, which in turn may optionally comprise an exhaust output passageway 235 (335 in FIG. 3A).

Figure 3B:
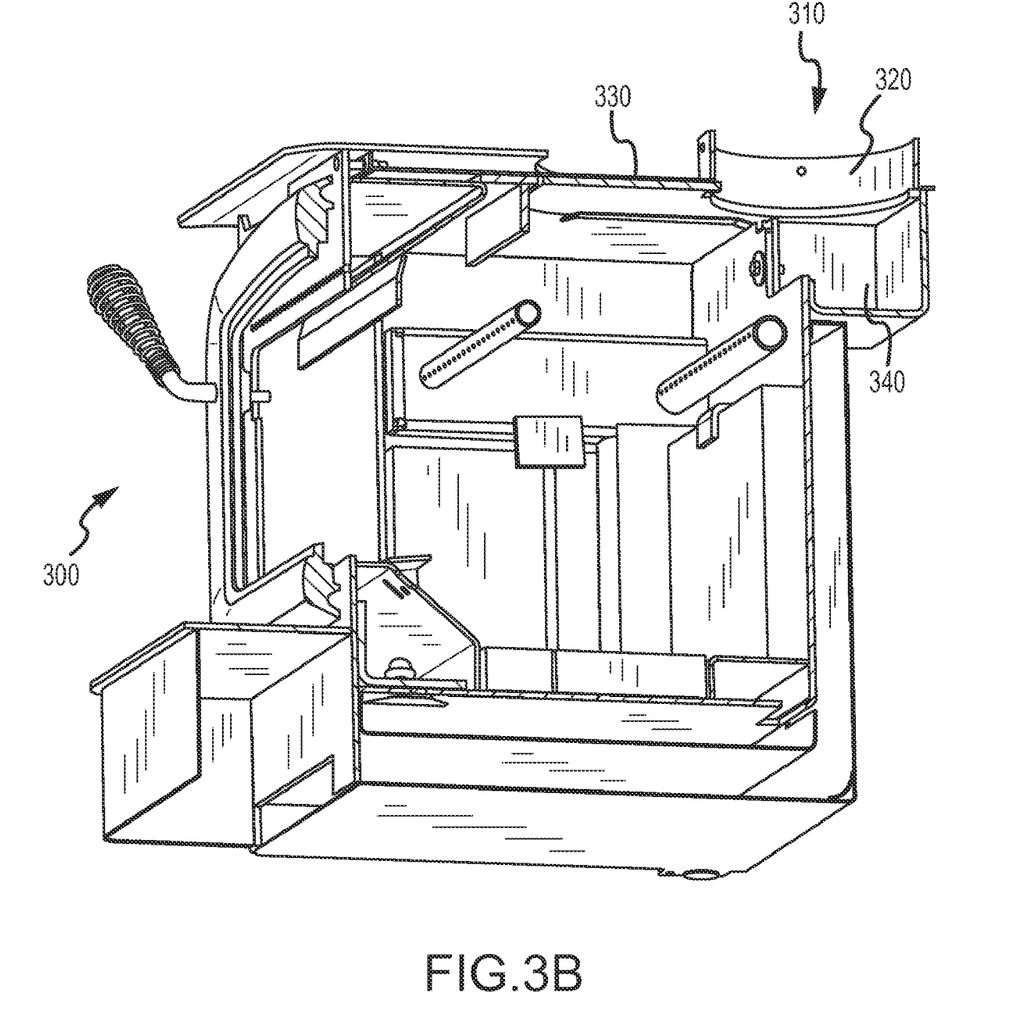
FIG. 3B illustrates an exemplary embodiment of the present invention showing a cutaway view of a firebox and an offset flue adapter in its assembled position within the firebox unit.

Continuing with a further exemplary embodiment of the present invention and referencing FIGS. 3A and 3B, a modular flue adapter system comprises firebox 300 and modular device 310. Modular device 310 further comprises first portion 330 connected to firebox 300 and second portion 320 configured to provide the conduit for exhaust between firebox 300 and the firebox flue. First portion 330 may optionally comprise an elongated substantially planar portion 325 (225 in FIG. 2C). In an exemplary embodiment and referring to FIG. 3A, second portion 320 comprises a bottom member 321 with a configured to provide an offset distance. Bottom member 321 is operatively coupled to two side members 322 along the width of bottom member 321. Bottom member 321 and each side member 322 are coupled to a back member 323. Similarly, bottom member 321 and each side member 322 are coupled to an adapter plate 324, such that the second portion provides an offset as a function of the width of bottom member 321 and defines an exhaust flow cavity 340. Adapter plate 324 is configured to be removably coupled to a firebox mounting plate 336. Further, second portion 320 comprises firebox flue 325, which is coupled to first portion 330 and to each of two side members 322, back member 323 and adapter plate 324 further defining exhaust flow cavity 340. As such, exhaust flow cavity 340 is in fluid communication with an offset chimney, where the offset is provided by modular device 310 and chimney is coupled to modular device 310 at firebox flue 325. Exhaust flow cavity 340 may optionally comprise an exhaust flow cavity passageway 345. In accordance with various exemplary embodiments, exhaust flow cavity passageway 345 and exhaust output passageway 335 provide a conduit for exhaust between the exhaust output of firebox 300 and second portion 320.

Notwithstanding modular device 310 having first portion 330 and second portion 320, modular device 310 may have a unitary construction or comprise multiple pieces. Moreover, modular device 310 may comprise the same or different materials (e.g., the same or different alloys).

Modular device 310 may provide the conduit for exhaust between firebox 300 and the firebox flue on the top of the firebox (as illustrated), the bottom, or any side thereof. In that regard, first portion 330 may connect to firebox 300 on a side different from the side on which second portion 320 provides the conduit for exhaust.

Figure 4A:
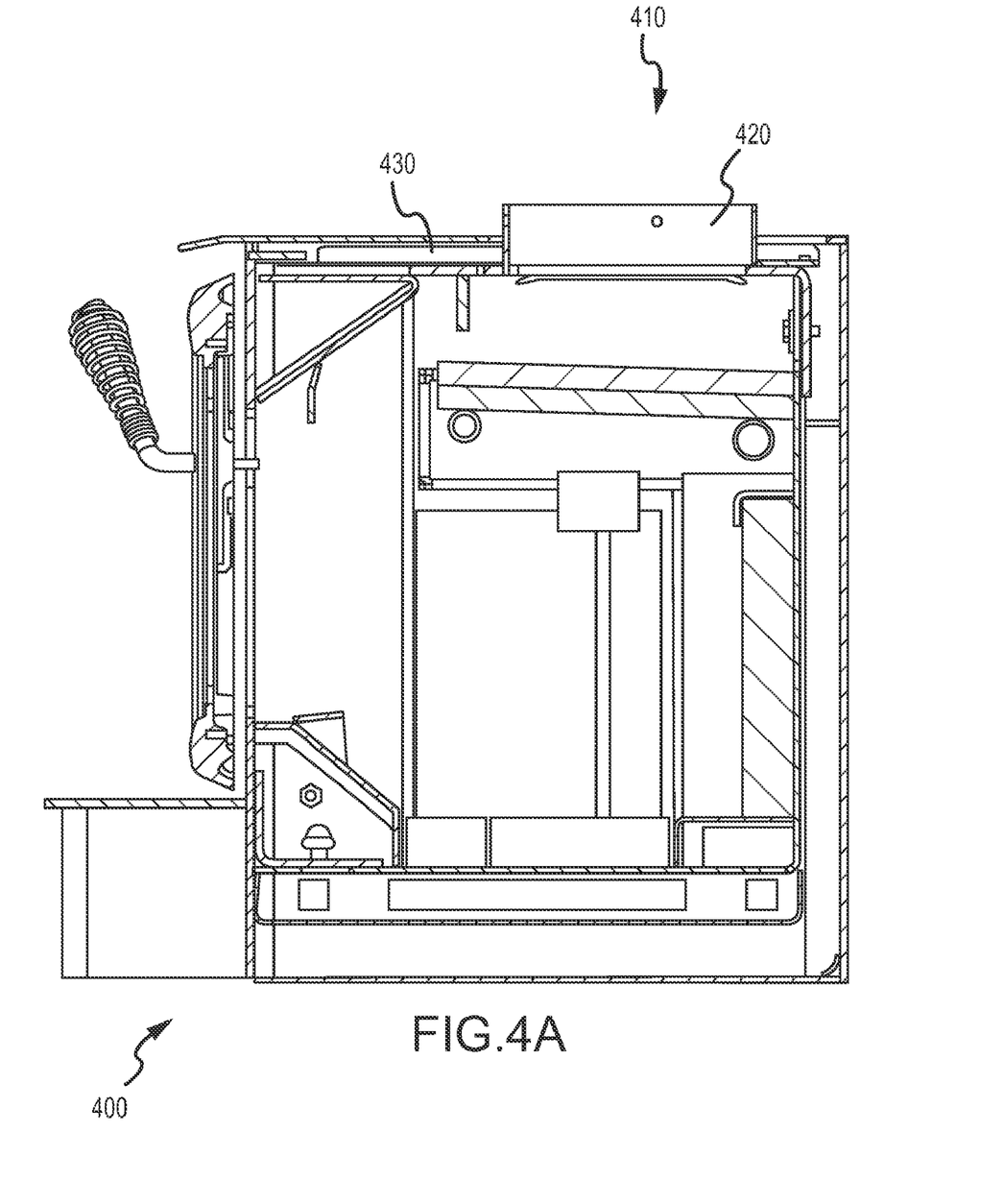
FIG. 4A illustrates an exemplary embodiment of the present invention showing a cutaway view of a firebox comprising a standard flue adapter.
Figure 4B:
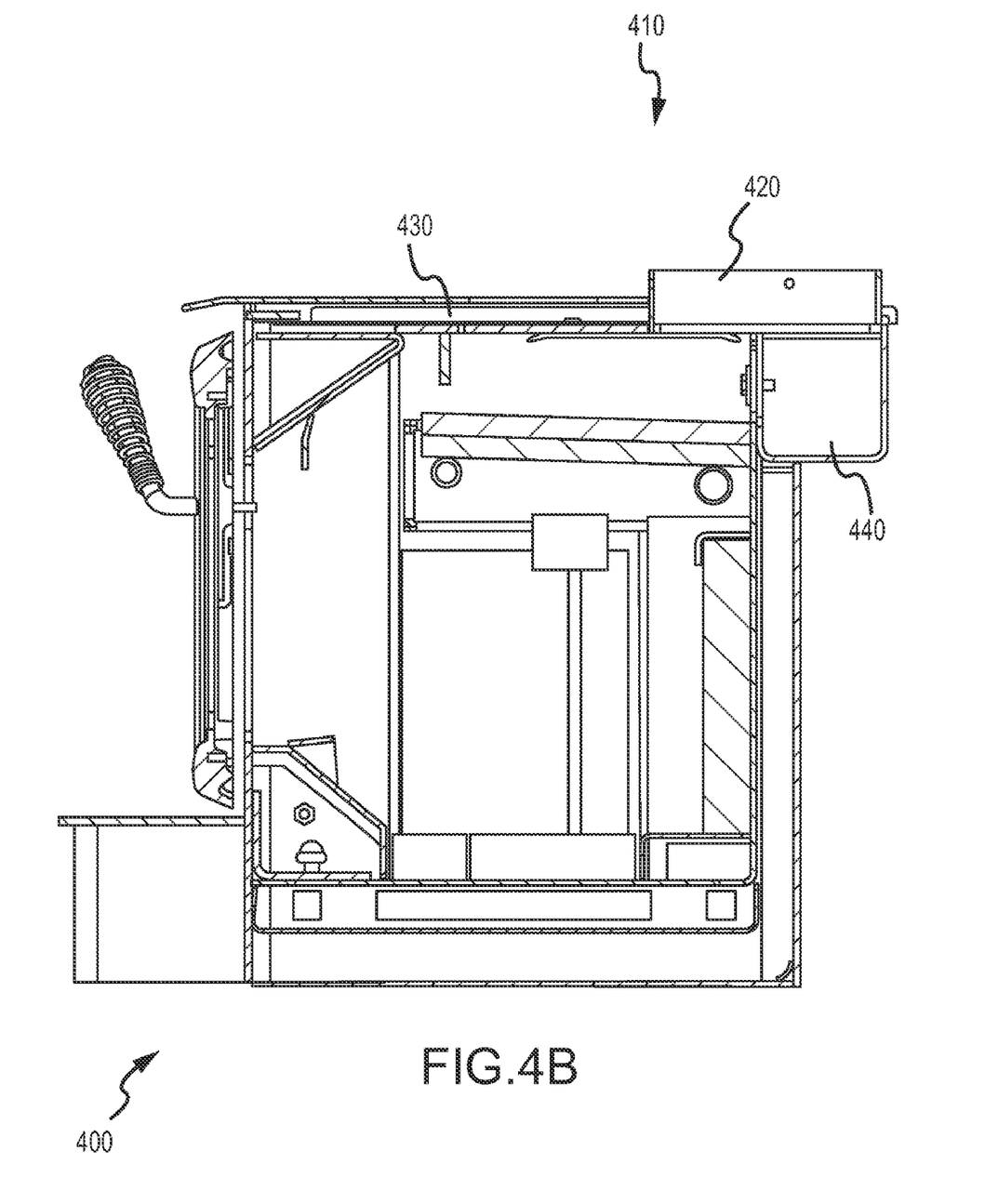
FIG. 4B illustrates an exemplary embodiment of the present invention showing a cutaway view of a firebox comprising an offset flue adapter.

Now turn to FIGS. 4A and 4B which depict a detailed example of various physical embodiments of the present invention comprising firebox 400 and modular device 410. First portion 430 of modular device 410 may or may not provide an offset distance between firebox 400 and the firebox flue. FIG. 4A illustrates a modular flue adapter system not having an offset distance, while FIG. 4B illustrates modular flue adapter system having an offset distance. That being said, and returning briefly to figures discussed earlier, FIGS. 1A and 1B illustrate a modular flue adapter system not having an offset distance while FIGS. 2A, 2B and 2C illustrate the modular flue adapter system having an offset distance.

The offset distance accommodated by first portion 430 may be plus or minus (±) 2.5 in, 3 in, 3.5 in, 4 in, 4.5 in, 5 in, 5.5 in, 6 in, 6.5 in or any other distance suitable for aligning firebox 400 with the firebox flue. In an exemplary embodiment, first portion 430 is further suited to provide an offset distance in any direction within a three dimensional coordinate system. By example, such directions may include left, right, forward, backward, up, down, diagonal or any combination thereof.

In an exemplary embodiment, an offset distance and/or direction is accommodated by altering the physical proportions of first portion 430 (e.g., shape, thickness, length, width). In this manner, the installer selects a preconfigured modular device having the appropriate offset.

However, first portion 430 of modular device 410 can provide an offset distance and/or direction between firebox 400 and the firebox flue in any number of ways within the scope of the invention described herein. In an exemplary embodiment, the elongated substantially planar portion of first portion 430 is adjustably coupled to the receiving portion of firebox 400. By way of example, an offset distance and/or direction may be accommodated by incorporating an extending, telescoping or sliding feature into first portion 430, or adjustably connecting first portion 430 to firebox 400 via bolts or the like through two or more holes or an open channel wherein the bolt may tighten in any hole or anywhere along the channel. In this manner, the installer selects the appropriate offset from an adjustable modular device.

While various exemplary modular flue adapter systems are illustrated and described herein in terms of first portion 430 providing an offset distance and/or direction for the sake of brevity, second portion 420 may contribute or provide an offset distance and/or direction in substantially the same manner as first portion 430.

With continued attention to FIGS. 4A and 4B, first portion 430 of modular device 410 can connect to firebox 400 in any number of ways and maintain the spirit of the invention described herein. The components may be coupled to each other via bolts, screws, dowels, welding, soldering, brazing, sleeves, brackets, clips, magnetism, or other means known in the art or hereinafter developed. The coupling may be permanent or temporary, and the coupling may include an adjustable coupling, thereby allowing the components to be extended away from each other or closer to each other.

With additional reference to FIGS. 4A and 4B, second portion 420 of modular device 410 acts as a conduit for exhaust between firebox 400 and the firebox flue. The cross section of second portion 420 may be a circle, square, rectangle, triangle, oval, ellipse or any other shape suitable for connecting to the firebox flue. Modular device 410 may optionally comprise an exhaust flow cavity 440. In various embodiments contemplated as being within the scope of the present invention, modular device 410 also incorporates one or more of an exhaust fan, an exhaust backflow prevention device, a flue closure device (e.g., a damper), and a device to deter mammals, birds and/or insects.

As above, second portion 420 of modular device 410 can connect to the firebox flue in any number of ways, all within the scope of the invention as contemplated and described herein. In an exemplary embodiment, second portion 420 is connected to the firebox flue via two or more bolts or the like. In yet another exemplary embodiment, the cross sectional area of second portion 420 is just smaller than the cross sectional area of the firebox flue such that the flue overlaps second portion 420 to minimize the escape of exhaust rising from firebox 400 to the flue. Alternative methods are contemplated by the present invention to minimize the escape of exhaust rising from firebox 400 to the flue. By way of example, a high temperature resistant rubber or composite seal may be used. Generally, any method to securely and effectively seal second portion 420 and the firebox flue known in the art or hereinafter developed is within the spirit and scope of the invention described herein.

Figure 5A:
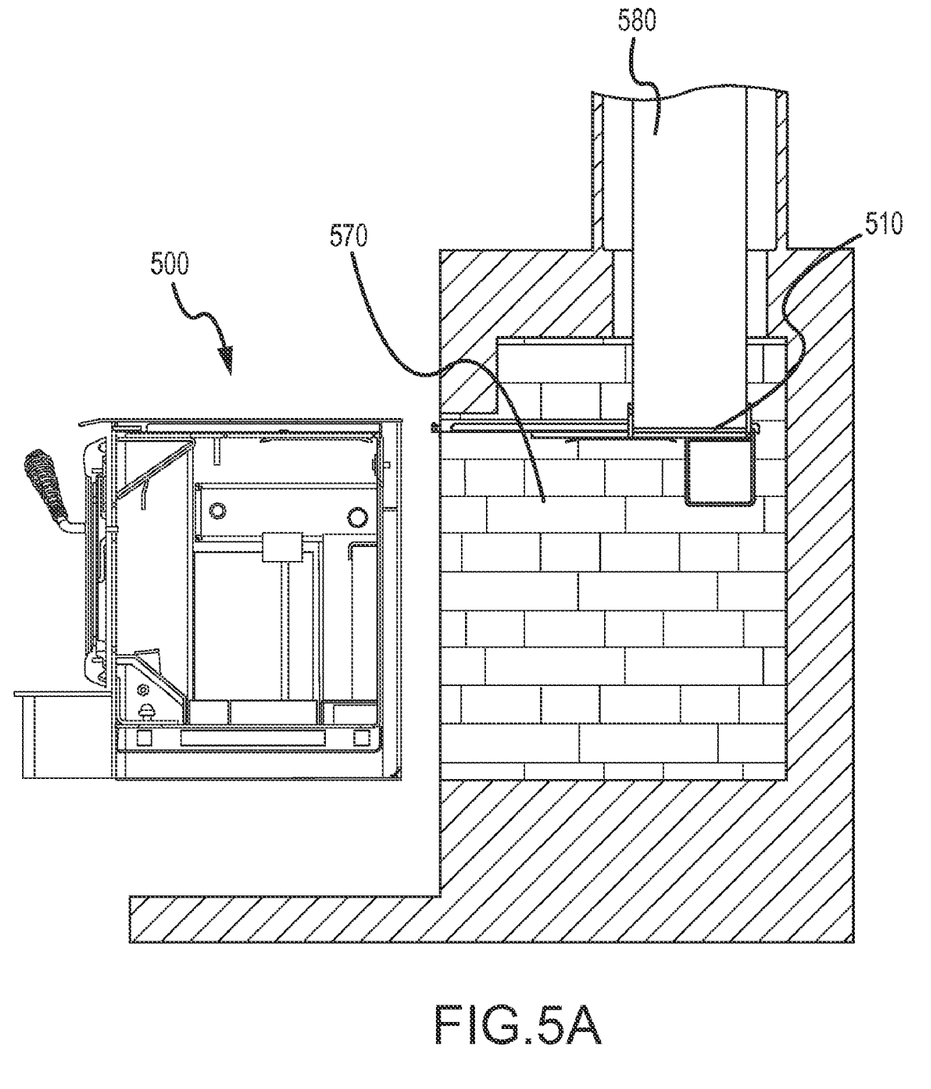
FIG. 5A illustrates an exemplary embodiment of the present invention showing an offset flue adapter connected to the preexisting flue before insertion of the firebox.
Figure 5B:
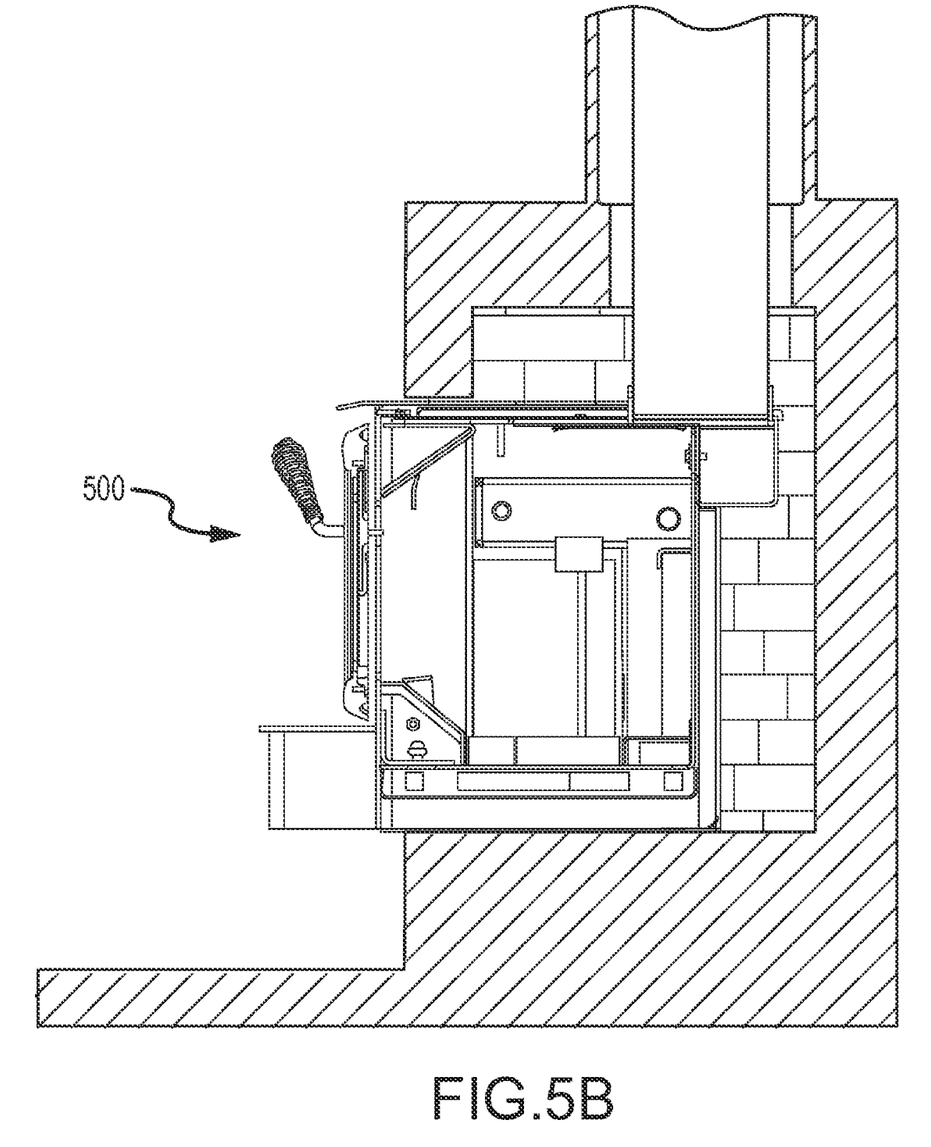
FIG. 5B illustrates an exemplary embodiment of the present invention showing an offset flue adapter connected to the preexisting flue and the inserted firebox.

Turning finally to FIGS. 5A and 5B, a modular flue adapter method contemplated by the invention comprises providing firebox 500, modular device 510, firebox flue 580, and optionally, firebox opening 570. FIG. 5A illustrates modular device 510 connected to firebox flue 580 and firebox 500 not inserted into optional firebox opening 570. FIG. 5B illustrates modular device 510 connected to firebox 500, firebox 500 being inserted into optional firebox opening 570 so as to provide a conduit for exhaust between firebox 500 and firebox flue 540.

The present invention sets forth a modular flue adapter system and method that is applicable to various heating system applications. It will be understood that the foregoing description is of exemplary embodiments of the invention, and that the invention is not limited to the specific forms shown. Various modifications may be made in the design and arrangement of the elements set forth herein without departing from the scope of the invention. For example, the location of components to match the heating system design, the different types of solid fuel applications, and the standalone aspect of the system and method can be suitably modified, adjusted, and/or re-configured. These and other changes or modifications are intended to be included within the scope of the present invention.

What is claimed is:

1. A fireplace or stove system configured to provide offsetting of a firebox flue, comprising:
   a firebox comprising an
      exhaust output;
      firebox mounting plate; and
      substantially flat top portion,
      a receivable slot; and
   a modular device comprising:
      a first portion connected to said firebox, said first portion comprising a planar member configured for slidable insertion within said receivable slot of said firebox such that said modular device is substantially planar with said substantially flat top portion when said modular device is coupled to said firebox; and
      a second portion coupled to said first portion and detachably coupled to said firebox mounting plate, said second portion comprising a bottom member, a pair of side members, a back member, an adapter plate and a firebox flue, wherein said bottom member is coupled to said pair of side members, said back member, and said adapter plate, and said firebox flue is coupled to said pair of side members, said back member and said adapter plate, such that said second portion defines a conduit for exhaust between said exhaust output and said firebox flue, said side member having an offset distance;
      wherein upon insertion of said first portion into said receivable slot, said adapter plate of said second portion abuts said firebox mounting plate to provide a seal, said modular device is at least partially internal within said firebox, and said firebox flue is offset by said offset distance relative to said firebox.

2. The system of claim 1, wherein said offset distance is between approximately 2.5 inches and 6.5 inches.

3. The system of claim 1, wherein said modular device provides an offset distance between said exhaust output and said firebox flue.

4. The system of claim 1, wherein said modular device provides an offset direction between said exhaust output and said firebox flue.

5. The system of claim 1, wherein said firebox further comprises a receiving portion, wherein said first portion further comprises an elongated substantially planar portion, and wherein said elongated substantially planar portion is adjustably coupled to said receiving portion.

6. The system of claim 1, wherein said modular device further comprises an exhaust flow cavity.

7. The system of claim 6, wherein said exhaust output further comprises an exhaust output passageway, wherein said exhaust flow cavity further comprises an exhaust flow cavity passageway, and wherein said exhaust flow cavity passageway and said exhaust output passageway provide a conduit for exhaust between said exhaust output and said second portion.

* * * * *